United States Patent [19]
Green

[11] 3,845,570
[45] Nov. 5, 1974

[54] INCLINOMETER

[76] Inventor: Wilbur Green, 116 Ruby Ln., McAllen, Tex. 78501

[22] Filed: Oct. 1, 1973

[21] Appl. No.: 402,307

[52] U.S. Cl. ................................................ 33/401
[51] Int. Cl. ............................................. G06k 9/12
[58] Field of Search ............ 33/391, 395, 396, 397, 33/398, 399, 400, 401, 402, 368

[56] References Cited
UNITED STATES PATENTS

| | | | |
|---|---|---|---|
| 1,257,090 | 2/1918 | Mattoon | 33/401 X |
| 1,375,141 | 4/1921 | Ford | 33/401 |
| 1,737,936 | 12/1929 | Mercer | 33/401 |
| 1,884,728 | 10/1932 | Kiesel | 33/395 |

*Primary Examiner*—William D. Martin, Jr.
*Assistant Examiner*—Charles E. Phillips
*Attorney, Agent, or Firm*—Bard & Springs

[57] ABSTRACT

In one exemplar embodiment, an inclinometer for indicating the grade or slope of a roadway traversed by a vehicle is provided. The inclinometer is provided with a pair of rotatable meter wheels that display the measured grade or slope through apertures in the housing of the inclinometer. One of the meter wheels indicates a "down" grade or slope while the other meter wheel indicates an "up" grade or slope. The meter wheels are each respectively actuated by gearing arrangements responding to rotation of a single gravity gear that rotates in response to inclination of the inclinometer either up or down.

9 Claims, 8 Drawing Figures

INCLINOMETER

BACKGROUND OF THE INVENTION

This invention relates to inclinometers of the type employed on vehicles to indicate the degree of grade or slope of the roadway being traversed by the vehicle.

There are instruments of the above type known in the prior art. They are usually characterized by the provision of a rotary element adapted to maintain a horizontal position under the influence of a weighted pendulum and cooperating with a relatively fixed index-element to indicate the degree of grade or slope of the roadway along which the vehicle is moving. Examples of such prior art are patents to Burns and Hespe, U.S. Pat. Nos. 1,451,387 and 1,476,076, respectively. Similarly, such prior art grade meters are also shown in the patents to Mercer and Smith, U.S. Pat. Nos. 1,737,936 and 1,984,236, respectively. However, these meters utilize a simple pendulum device to actuate, through appropriate gearing — a single rotary element or wheel which displays the degree of slope or grade being traversed. One disadvantage of such prior art is that in utilizing only one rotary element, means of providing damping is critical since the single rotary element is responsive to movement of the gravity actuated pendulum in either direction.

In patents to Ichtertz and Bridy, U.S. Pat. Nos. 983,622 and 2,512,135, respectively, leveling devices that utilize a single rotary element moving in response to a weighted pendulum are also shown.

In Halloran, U.S. Pat. No. 1,576,437, a gravity level indicating device is disclosed that actuates a pair of rotary elements that indicate the degree of inclination of a telescope with relation to a true horizontal line. However, the pair of rotary elements are geared to rotate together and both are utilized to indicate the measured angle.

Accordingly, one feature of the present invention is to provide an inclinometer that utilizes a pair of rotary elements, each actuated independent of the other, to indicate the degree of slope or grade being traversed by a vehicle, one of the rotary elements indicating an upgrade or inclination and the other indicating a downgrade or declination.

Another feature of the present invention is to provide an inclinometer for indicating the degree of inclination of a vehicle that utilizes a pair of rotary elements, each actuated independently of the other by a single gravity actuated gear or pendulum.

SUMMARY OF THE INVENTION

The present invention remedies the problems of the prior art by providing an inclinometer having a pair of rotatable meter wheels that display the measured grade or slope of the roadway traversed by the vehicle. One meter wheel displays the degree of "down" slope while the other displays the degree of "up" slope. The meter wheels are independent of each other and are independently actuated through suitable gearing in response to movement of a single gravity gear or pendulum. The single gravity gear rotatable about a first axis or pendulum engages an "up" or "down" axle gear mounted for rotation about a second axis. The appropriate axle gear is directly connected by a shaft, rotating about the second axis, to an "up" or "down" drive gear. The pair of drive gears engage a pair of wheel gears that are each directly attached to the respective "up" or "down" meter wheels that are adapted for rotation about the first axis. Provision is made for the gravity gear to engage only one of the axle gears at a time, either "up" or "down," thus insuring that only one of the meter wheels will rotate and indicate the "up" or "down" slope as the case may be.

In accordance with a principle of this invention, an inclinometer is provided comprising a housing having a pair of spaced apertures, a pair of meter wheels mounted for rotation about a first axis within said housing and having a series of numerals imprinted about the rims of said wheels and observable through respective ones of said housing apertures as said meter wheels rotate, a gravity actuated gear mounted for rotation about said first axis and adapted to rotate in opposite directions with respect to said housing in response to inclination of said housing either upwardly or downwardly, a pair of spaced axle gears mounted for rotation about a second axis within said housing and each adapted for engaging said gravity actuated gear only when said gravity actuated gear rotates in one direction, a pair of spaced drive gears mounted for rotation about said second axis and each attached to one of said axle gears for rotation therewith, and a pair of spaced meter wheel gears each attached to one of said meter wheels and rotatable therewith about said first axis, each of said meter wheel gears engaging one of said drive gears for rotating one of said meter wheels in response to rotation of said gravity actuated gear for indicating the degree of inclination of said housing.

BRIEF DESCRIPTION OF THE DRAWINGS

In order that the manner in which the above-recited advantages and features of the invention are attained can be understood in detail, a more particular description may be had by reference to specific embodiments thereof which are illustrated in the appended drawings, which drawings form a part of this specification. IT is to be noted, however, that the appended drawings illustrate only typical embodiments of the invention and therefore are not to be considered limiting of its scope for the invention may admit to further equally effective embodiments.

In the Drawings.

DETAILED DESCRIPTION OF THE PREFERRED EMBODIMENTS

Figure 1:
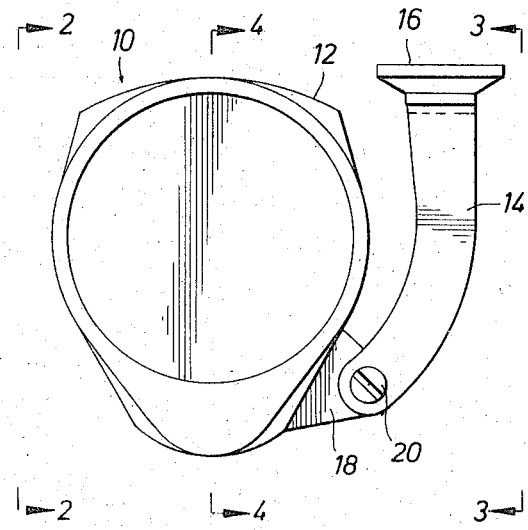
FIG. 1 is a side view of the inclinometer and its mounting bracket.
Figure 2:
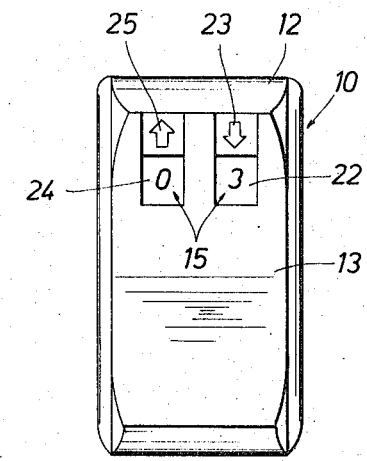
FIG. 2 is an end view of the inclinometer showing the up and down slope readings.
Figure 3:
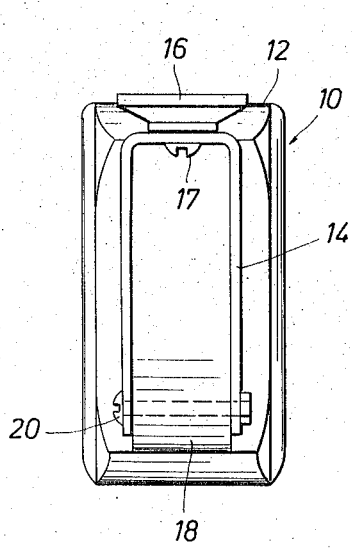
FIG. 3 is a rear view of the inclinometer and its mounting bracket.

Referring now to FIGS. 1, 2 and 3, the inclinometer or grade meter is shown. The inclinometer 10 has a housing 12 with a pair of apertures 15 in the front face of the housing 13 that display the up and down meter wheel slope readings 24 and 22. Indicia 23 and 25 indicate whether the readings are for a down or up grade, respectively. The rear portion of the inclinometer has an extension 18 for attachment to a mounting bracket 14. The extension is attached to the mounting bracket 14 by means of nut and bolt 20, and the mounting bracket 14 is attached to a mounting fixture 16 by means of a screw 17. Mounting bracket 14 and mounting fixture 16 permit the inclinometer 10 to be attached to the dashboard of a motor vehicle or to some other point in the motor vehicle suitable for attachment of the mounting bracket. Of course, it is to be understood that while it is preferred to mount the instrument on the dashboard or the windshield of the vehicle, substantially in the manner shown and described, where it can be constantly observed by the driver of the vehicle, it may be attached to any other conveniently located part of the vehicle without lessening its usefulness or changing its mode of operation.

Figure 5:
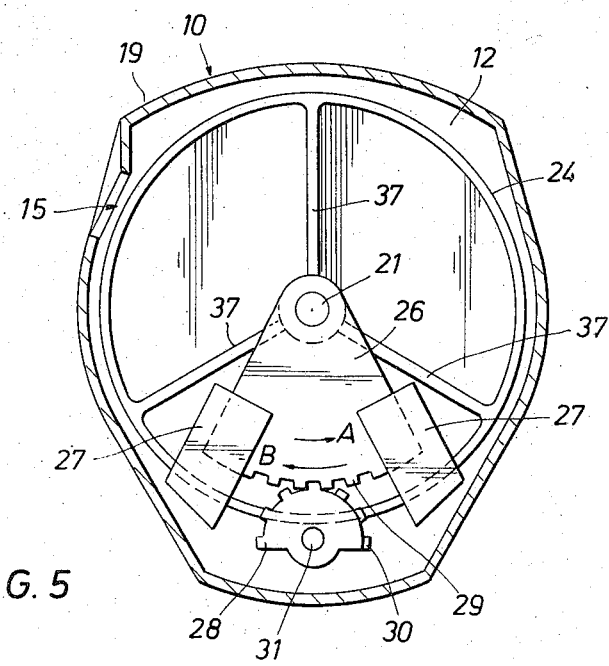
FIG. 5 is a vertical cross-sectional view of the inclinometer taken along lines 5—5 of FIG. 4.
Figure 4:
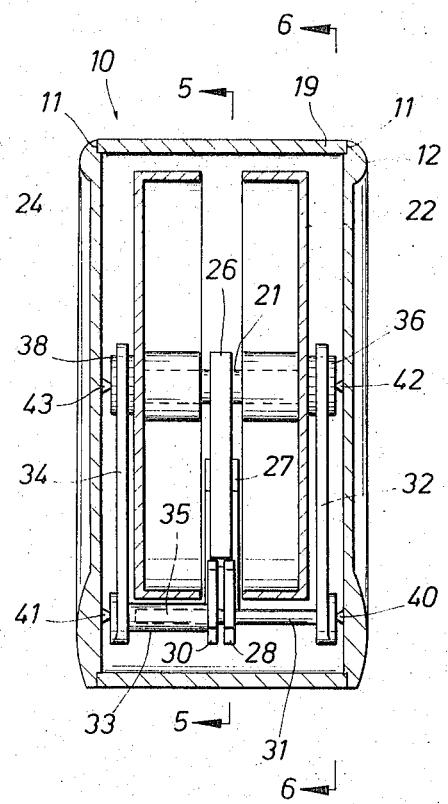
FIG. 4 is a vertical cross-sectional view of the inclinometer taken along lines 4—4 of FIG. 1.
Figure 6:
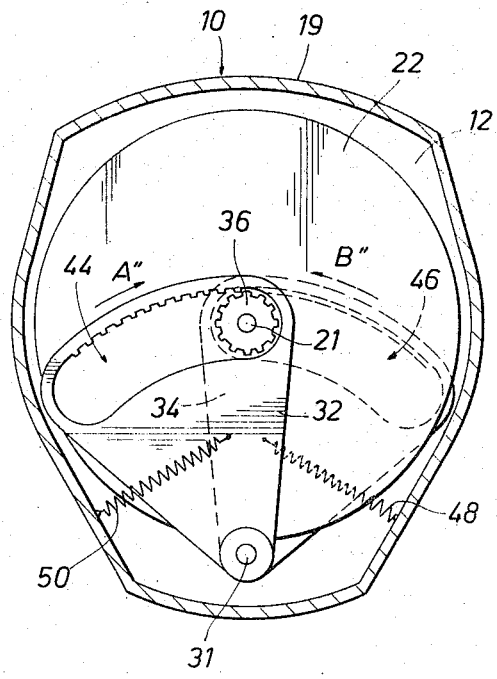
FIG. 6 is a vertical cross-sectional view of the inclinometer taken along lines 6—6 of FIG. 4.

Referring now to FIGS. 4, 5 and 6, details of the working apparatus of the inclinometer are shown. A vertical cross-section of the inclinometer 10 is shown in FIG. 4. The case or housing of the inclinometer is comprised of a side member 12 and a circumferential end member 19 that are shown butt-jointed together at 11. The housing may conveniently be made of a plastic or other synthetic material to make it light-weight and strong. However, the housing could of course be comprised of any other suitable material. About a first axis, defined by axle 21 mounted between pivot points 42 and 43, a gravity gear 26 is mounted for limited rotation. The gravity gear 26 is triangular shaped with its downward projecting edge having an arcuate configuration that is the segment of a circle, the edge having projecting gear teeth 29. Attached to opposite sides of the gravity gear 26 are weights 27 that counterbalance the gravity gear and cause it to have a pendulum action when the inclinometer housing is inclined upwardly or downwardly.

The gear teeth 29 of gravity gear 26 engage a pair of axle gears 28 and 30 that are mounted for limited rotation about a second axis defined by pivot points 40 and 41 with interconnecting axles 31 and 33 therebetween. Axle gear 28 is the "down" axle gear, as it is actuated when the inclinometer housing is inclined downwardly to indicate a downgrade or slope, and axle gear 30 is the "up" axle gear that is engaged by gravity gear 26 when the inclinometer is inclined upwardly to indicate an upgrade or slope. Down axle gear 28 is attached via axle 31 to a "down" drive gear 32 that moves in conjunction with axle gear 28. Similarly, "up" axle gear 30 is rigidly connected via axle 33 to an "up" drive gear 34. It will be noted that axles 31 and 33 move about the same axis between pivot points 40 and 41 with axle 31 having an axle extension 35 that projects within the interior of axle 33, allowing axle 31 and extension 35 to rotate independently of axle 33. The engagement of the gravity gear 26 with each of the axle gears 28 and 30 and their actuation of the respective drive gears, 32 and 34, will be hereinafter further described.

Drive gears 32 and 34 are triangular-shaped gears having arcuate slots, 44 and 46, respectively, disposed in the end of the drive gears 32 and 34 opposite the apex end which is rigidly attached to respective axle gear axles 31 and 33, respectively. Disposed within the arcuate slots 44 and 46 of drive gears 32 and 34, respectively, are gears 36 and 38 that are rigidly attached to meter wheels 22 and 24, respectively, which are journeled for rotation about the first axis defined by pivot points 42 and 43 and rotate about axle 21. Drive gear 32 has drive teeth disposed about at least a portion of the periphery of the arcuate slot 44 to engage the teeth of drive gear 36, as will be hereinafter further defined. Of course, the operation of gear 38 in conjunction with drive gear 34 is identical to the operation of gear 36 and drive gear 32, and hence the explanation of one will suffice for the other. As hereinbefore noted, there are numerals indicating the degree of grade or slope imprinted on the rims of the meter wheels 22 and 24 that are exposed through apertures 15 in housing 12 to visually indicate the degree of "up" or "down" slope or grade of the roadway upon which the vehicle is traveling.

Figure 7:
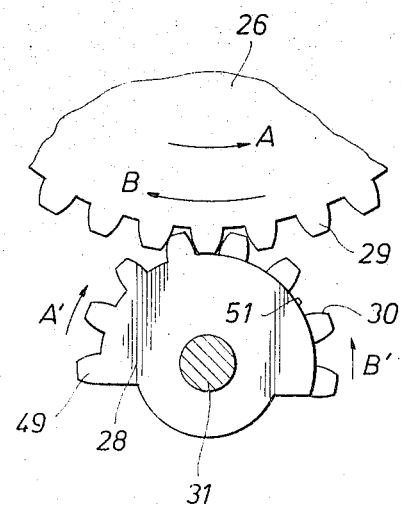
FIG. 7 is an enlarged fragmentary detail view of the axle gears shown engaging the gravity gear.

Referring now to FIGS. 4, 5, 6, 7 and 8, the operation of the inclinometer 10 will be described. As the inclinometer 10 is inclined upwardly or downwardly in response to the change in slope or grade of the roadway upon which the vehicle is traveling, the gravity gear 26 will rotate about axis 21 seeking to remain in a vertical position because of its counterbalanced weights 27. As the housing of the inclinometer is rotated upwardly or downwardly and gravity gear 26 seeks to remain in a vertical position, gravity gear 26 will rotate about axle 21 and engage either "down" axle gear 28 or "up" axle gear 30. As shown in FIGS. 5 and 7, gravity gear 26 will move in the direction shown by the arrow A when the inclinometer moves in response to a down grade or slope, and the teeth 29 of gravity gear 26 engage the teeth of "down" axle gear 28, causing axle gear 28 to move in the direction of the arrow shown by A'. When the inclinometer 10 is tilted upwardly in response to an upgrade or slope upon which the vehicle is traveling, the gravity gear 26 will move in the direction shown by the arrow B, and its teeth 29 will engage the teeth of the "up" axle gear 30 causing axle gear 30 to move in the direction shown by arrow B'. It will be noted that "down" axle gear 28 has a toothed segment or section having teeth 49 and a sector 51 that is free of teeth. "Up" axle gear 30 has the same toothed segment, but the toothed segment is opposite the sector 51 of gear 28 that is free of teeth. Accordingly, when gravity gear 26 moves in the direction shown by arrow A, teeth 29 of gravity gear 26 will engage teeth 49 of "down" axle gear 28, rotating the "down" axle gear in the direction shown by arrow A', as hereinabove described. However, when the gravity gear 26 moves in the direction shown by arrow B, teeth 29 of gravity gear 26 cannot engage axle gear 28 but do engage the teeth of axle gear 30 to move axle gear 30 in the direction shown by arrow B', as hereinafter described. Accordingly, it will be noted that the axle gears move in response to the rotation of gravity gear 26 in only one direction, either "up" or "down."

When "down" axle gear 28 rotates in response to rotation of gravity gear 26, "down" drive gear 32, connected to axle gear 28 by means of axle 31, rotates in the same direction as "down" gear 28. As will be further explained with regard to FIGS. 6 and 8, arcuate slot 44 is disposed in the end of "down" drive gear 32 opposite its apex end which is mounted for rotation about pivot point 40. The outer periphery of slot 44 has teeth 45 disposed therein for engaging teeth 39 of the "down" meter wheel gear 36. "Down" drive gear 32 is biased by means of an actuating spring 48 connected between one edge of gear 32 and the inclinometer housing 12. The actuating spring 48 biases gear 32 to rotate in the desired direction, shown in FIGS. 5 and 8 by the arrow A''. As "down" axle gear 28 rotates in the direction A' (see FIG. 7), drive gear 32 rotates in the direction shown by the arrow A'' (see FIGS. 6 and 8), and the teeth 45 of gear 32 engage teeth 39 of meter wheel gear 36, thus rotating gear 36 which is rigidly connected to "down" meter wheel 22, thereby rotating meter wheel 22 to display through housing aperture 15 an indicia of the down grade or slope of the roadway over which the vehicle is traversing.

When gravity gear 26 moves in response to an upgrade or up slope, it rotates in the direction shown by arrow B (see FIGS. 5 and 7), thereby causing its teeth 29 to engage the teeth of "up" axle gear 30 and causing axle gear 30 to move in the direction shown by the arrow B' (see FIG. 7).

Since "up" drive gear 34 is rigidly connected to "up" axle gear 30 by means of drive shaft or axle 33, "up" drive gear 34 will rotate in response to rotation of the "up" axle gear 28 in the direction B'' shown by the arrow in FIG. 6. Disposed within the arcuate slot 46 of "up" drive gear 34 is a meter wheel gear 38 that is rigidly connected to "up" meter wheel 24. The "up" drive gear 34 is biased for rotation in direction B'' by means of an actuating spring 50, the operation of which is identical to the operation of actuating spring 48 hereinabove described. The engagement and operation of "up" axle gear 30, "up" drive gear 34, gear 38 and "up" meter wheel 24 is identical to the operation hereinabove described for the "down" meter wheel 22 and will not be further described.

Figure 8:
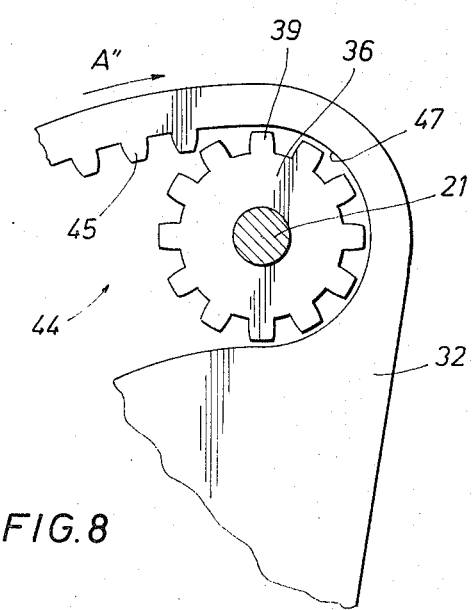
FIG. 8 is an enlarged fragmentary detail view of the meter wheel gear engaging the drive gear.

As may be seen in FIGS. 6 and 8, the arcuate slot 44 in "down" drive gear 32 has a sector 47 free of gear teeth to accommodate the meter wheel gear 36 disengaged from the drive gear teeth 45 when the drive gear 32 is in its "zero" position. "Zero" position means that the respective meter wheel 22 indicates a "0" grade or slope. Similarly, "up" drive gear 34 has a sector devoid of gear teeth for accommodating gear 38 in the same manner as hereinabove just described for drive gear 32. As will be noted, the space in each arcuate slot disposed in drive gears 32 and 34 that is free of teeth engages meter wheel gears 36 and 38, respectively, to limit rotation of drive gears 32 and 34 in one direction and defines the "zero" position of the drive gears 32 and 34, and thus the "zero" positions of respective meter wheels 22 and 24.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. An inclinometer, comprising
 a housing having a pair of spaced apertures,
 a pair of meter wheels mounted for rotation about a first axis within said housing and having a series of numerals imprinted about the rims of said wheels and observable through respective ones of said housing apertures as said meter wheels rotate,
 a gravity actuated gear mounted for rotation about said first axis and adapted to rotate in opposite directions with respect to said housing in response to inclination of said housing either upwardly or downwardly,
 a pair of spaced axle gears mounted for rotation about a second axis within said housing, one of said axle gears adapted for engaging said gravity actuated gear only when said gravity actuated gear rotates in one direction, the other of said axle gears adapted for engaging said gravity actuated gear only when said gravity actuated gear rotates in the opposite direction,
 a pair of spaced drive gears mounted for rotation about said second axis and each attached to one of said axle gears for rotation therewith, and
 a pair of spaced meter wheel gears each attached to one of said meter wheels and rotatable therewith about said first axis, each of said meter wheel gears engaging one of said drive gears for rotating one of said meter wheels in response to rotation of said gravity actuated gear for indicating the degree of inclination of said housing.

2. The inclinometer described in claim 1, wherein said gravity actuated gear includes a pair of spaced weights attached to said gear for causing said gear to rotate with respect to said housing when said housing is inclined.

3. The inclinometer described in claim 1, wherein said drive gears comprise a generally triangular shaped member rotatable about the apex of said triangular shaped member and having an arcuate slot disposed in the end of said member opposite said apex, said arcuate slot having gear teeth disposed along at least one of its arcuate boundaries for engaging one of said meter wheel gears, said arcuate slot having sufficient space at one end of said slot free of gear teeth to accommodate said meter wheel gear disengaged from said drive gear teeth when the drive gear is in its zero position.

4. The inclinometer described in claim 1, wherein said pair of axle gears each have gear teeth only over a first portion of said gear surface for disengaging from said gravity actuated gear when it rotates in an opposite direction from the direction in which said axle gear is adapted to rotate.

5. The inclinometer described in claim 1, wherein said drive gears include a start actuating spring connected between said housing and each of said drive gears for biasing said drive gear in a predetermined direction of rotational movement.

6. An inclinometer, comprising
 a housing having a pair of spaced apertures,
 a gravity actuated gear mounted for limited rotation about a first axis within said housing, said gravity actuated gear having a pair of spaced weights attached to said gear for causing said gear to rotate with respect to said housing as said housing is inclined upwardly or downwardly,
 a pair of spaced axle gears mounted for rotation about a second axis within said housing and each adapted for engaging said gravity actuated gear, each of said axle gears adapted for rotational movement in one direction only, one of said axle gears engaging said gravity actuated gear when said gravity actuated gear rotates in response to said housing being inclined downwardly, and the other one of said axle gears engaging said gravity actuated gear when said gravity actuated gear rotates in response to said housing being inclined upwardly, a pair of spaced drive gears mounted for rotation about said second axis and each attached to one of said axle gears for rotation therewith, a pair of spaced meter wheel gears mounted for rotation about said first axis and each adapted for engaging one of said drive gears, and a pair of spaced meter wheels mounted for rotation about said first axis and each fixed to one of said meter wheel gears for rotation therewith, each meter wheel adapted for rotation in a direction opposite the other meter wheel, each meter wheel having a series of numerals imprinted about the rim of said wheels and observable through one of said housing apertures for indicating the degree of incline of the inclinometer housing in response to rotation by said gravity actuated gear.

7. The inclinometer described in claim 6, wherein said drive gears comprise a generally triangular shaped member rotatable about the apex of said triangular shaped member and having an arcuate slot disposed in the end of said member opposite said apex, said arcuate slot having gear teeth disposed along at least one of its arcuate boundaries for engaging one of said meter wheel gears, said arcuate slot having sufficient space at one end of said slot free of gear teeth to accommodate said meter wheel gear disengaged from said drive gear teeth when the drive gear is in its zero position.

8. The inclinometer described in claim 7, wherein each of said drive gears includes a start actuating spring connected between said housing and one edge of said drive gear for biasing said drive gear in a direction of rotation to enable said drive gear teeth to engage said meter wheel gear.

9. An inclinometer, comprising a housing having a pair of apertures, a pair of meter wheels mounted for rotation about a first axis within said housing, said meter wheels having a series of inclination indicating numerals imprinted about the rim of said wheels, said numerals observable through respective ones of said apertures as said meter wheels rotate, a pair of meter wheel gears mounted for rotation about said first axis, each fixed to one of said meter wheels and rotatable therewith, a pair of drive gears mounted for rotation about a second axis within said housing, each of said drive gears matable with one of said meter wheel gears, each of said drive gears adapted for rotation in opposite directions, a pair of axle gears mounted for rotation about said second axis and each fixed to one of said drive gears for movement therewith, and a gravity gear mounted for rotation about said first axis and matable with each of said axle gears, said gravity gear adapted for rotating as the inclinometer housing is tilted upwardly or downwardly, the rotation of said gravity gear in one direction causing rotation of only one of said axle gears and mating one of said drive gears, said one drive gear mating with one meter wheel gear for causing one of said meter wheels to rotate and display one of said inclination indicating numerals through one of said housing apertures, the rotation of said gravity gear in the opposite direction causing rotation of the other one of said axle gears and mating drive and meter wheel gears for rotating the other one of said meter wheels for displaying another of said inclination indicating numerals through the other one of said housing apertures.

* * * * *

UNITED STATES PATENT AND TRADEMARK OFFICE
CERTIFICATE OF CORRECTION

PATENT NO. : 5,845,570

DATED : December 8, 1998

INVENTOR(S) : Takashi Isozaki, et al

It is certified that error appears in the above-identified patent and that said Letters Patent is hereby corrected as shown below:

**On the Title Page, Item [*] Notice, "5,476,034" should read ---- 5,476,043 -----.**

Signed and Sealed this

Twenty-second Day of May, 2001

Attest:

NICHOLAS P. GODICI

Attesting Officer     Acting Director of the United States Patent and Trademark Office